J. BORDEN.
MOLDS FOR PLASTER-CASTS.
No. 193,917. Patented Aug. 7, 1877.
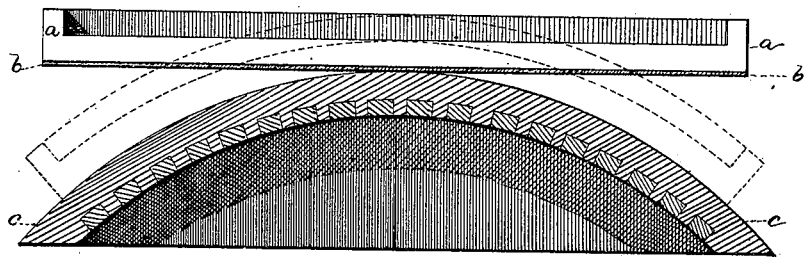
Witnesses.
L. H. Latimer
W. J. Pratt
Inventor.
John Borden
per Crosby & Gregory.
Attys.

UNITED STATES PATENT OFFICE.

JOHN BORDEN, OF BOSTON, MASSACHUSETTS.

IMPROVEMENT IN MOLDS FOR PLASTER CASTS.

Specification forming part of Letters Patent No. 193,917, dated August 7, 1877; application filed September 7, 1876.

*To all whom it may concern:*

Be it known that I, JOHN BORDEN, of Boston, Suffolk county, and Commonwealth of Massachusetts, have invented an Improvement in Molds for Plaster Casts, of which the following is a specification:

This invention relates to improvements in molds for the manufacture of plaster casts for moldings, plates, &c., in connection with interior architectural decoration; and the invention consists in a mold constructed as hereinafter described, and also in the method of operating such mold, and forming moldings, curved or flat plates, arches, and ornamental surfaces.

These moldings and ornamental surfaces in plaster work have heretofore been cast in small pieces by the use of molds made of wax or glue; but large figures cannot be formed, because of the difficulty of handling the molds.

In this my invention I am enabled to cast plates or moldings of any desired size, and flat or curved, or plain or ornamental.

My mold is composed of wax, or of glue compounds, and one or more sheets of canvas, or other suitable fabric, laid in the material of which the mold is formed. The design representing the surface or thing to be duplicated or produced in plaster, and, preferably, in fibrous plaster, is covered with the wax or glue, the canvas being laid therein. This mold so produced is strengthened by the canvas, only a small amount of wax or glue is necessary to form it, and the mold is consequently light. The base of the mold, or its thickness, exclusive of projecting surfaces for ornamentation, is usually from one-fourth to one-half inch, more or less.

The mold removed from the design may be used to form moldings, plates, &c., producing them as straight moldings or flat plates; or, if the moldings or plates are to be used on curved surfaces, then I prepare a form the reverse of the contour of the surface to which the molding or plate is to be applied, and over such form I bend the thin wax or glue mold, strengthened, as before described, by the canvas, and the mold in its bent condition may then be filled with plaster to form a curved molding or plate adapted to be fitted to the surface, the opposite of the said form.

In preparing a mold for curved work, I first form a flat model in plaster, as usual, providing it with the desired ornamental figure or design, taking care, however, to make the lines more or less curved or abrupt, according to the degree of curvature to be subsequently given to the mold, and on this straight plaster model so formed I cast the wax or glue, embedding in it the canvas or fibrous material, and when lifted from the model the mold is subsequently bent to the desired curve, and so curved it may be used as a mold to produce the desired curved molding or plate, or other plaster article herein described.

This curved mold may be made as cheaply as an ordinary straight mold, and by it curved, or irregular, or angular moldings or plates may be produced as cheaply as if straight.

The lines of the figure to be produced in the plaster cast can be more easily formed on the plane surface of a straight mold than on a curved mold.

In making a mold by this process, the mold being cast flat, it is easy to make the mold of uniform thickness and strength, which would be very difficut if the mold was cast curved. The mold may be made of any desired size, and, because of its flexibility and strength, may be handled without being broken.

In the drawing, *a* denotes the mold cast flat, or horizontal, or as a plane surface, a mold of plaster, as before described, being used to produce it. The mold *a* is suitably ornamented, but as this invention is not limited to any particular pattern, it has been considered unnecessary to show the ornamented surface.

The fibrous material for strengthening the mold is shown at *b*.

The mold cast as a plane surface, if to be used to form a curved ornament or plate, is then bent over a former, *c*, the mold then assuming the position shown in dotted lines. This former may be of any desired shape.

I claim—

In the art of forming molds for plaster casts, a combined wax or glue and canvas-strengthened mold, formed straight, and then bent into desired shape, to operate substantially as and for the purpose described.

In testimony whereof I have signed my name to this specification in the presence of two subscribing witnesses.

JOHN BORDEN.

Witnesses:
G. W. GREGORY,
W. J. PRATT.